April 1, 1969     R. A. JONES     3,435,996

POSITIVE EXPULSION DEVICE

Filed July 6, 1967

RICHARD A. JONES
*INVENTOR.*

BY *Steven F. Stone*

ATTORNEY

United States Patent Office 3,435,996
Patented Apr. 1, 1969

3,435,996
POSITIVE EXPULSION DEVICE
Richard A. Jones, Los Gatos, Calif., assignor to United Aircraft Corporation, East Hartford, Conn., a corporation of Delaware
Filed July 6, 1967, Ser. No. 651,542
Int. Cl. G01f 11/08
U.S. Cl. 222—386.5                 4 Claims

ABSTRACT OF THE DISCLOSURE

A positive expulsion tank containing a bladder which is expanded to expel the contents of the tank. The bladder is separated from the contents of the tank by a rigid piston sealed to the tank by a frangible hermetic seal, which is maintained free from cyclic pressure loads by compressive load bearing means coacting with said piston.

---

Positive expulsion devices are being used to provide complete and controlled delivery of a fluid stored in a tank and are finding wide application as fuel or oxidizer tanks for fluid propellant rocket motors. Such tanks generally comprise a bladder which can be expanded to fill the tank and force the contents of the tank through an outlet. Since the fuel or oxidizer materials are generally reactive liquids, frangible diaphragms have been provided to separate and protect the bladder from the contents of the tanks as shown for example in U.S. Patent No. 2,980,177 of William J. Glasson for Expulsion-Bag Tank for Liquid Propellant. When tanks of this general type are loaded and stored for extended periods of time, failure of the diaphragm may occur as a result of thermal cycling of the apparatus. Repeated temperature changes cause repeated changes of the vapor pressure of the fluid within the tank which in turn cause repeated distortion of the diaphragm. Fatigue failure can then occur which permits the fluid to contact and destroy the bladder.

In addition, when such devices are actuated the diaphragm may not break completely through which may prevent uniform expansion of the bladder. Also the rough edge of the diaphragm may tear the bladder as it expands thereby rendering the device inoperative.

According to this invention a positive expulsion tank is provided having a bladder hermetically sealed and separated from the contents of the tank by a rigid piston and a frangible hermetic seal. Means are provided for preventing thermal cycling from causing fatigue failure of the seal. Means are also provided for assuring uniform expansion of the bladder and for preventing tearing of the bladder.

It is accordingly an object of this invention to provide a positive expulsion device capable of prolonged thermal cycling without failure.

It is another object of this invention to provide for uniform rupture of the frangible hermetic seal in a positive expulsion device.

It is another object of this invention to prevent tearing of the bladder of a positive expulsion device.

It is another object of this invention to provide improved sealing means for positive expulsion devices.

These and other objects of this invention will be readily apparent from the following description with reference to the accompanying drawing wherein.

Figures 1, 2:
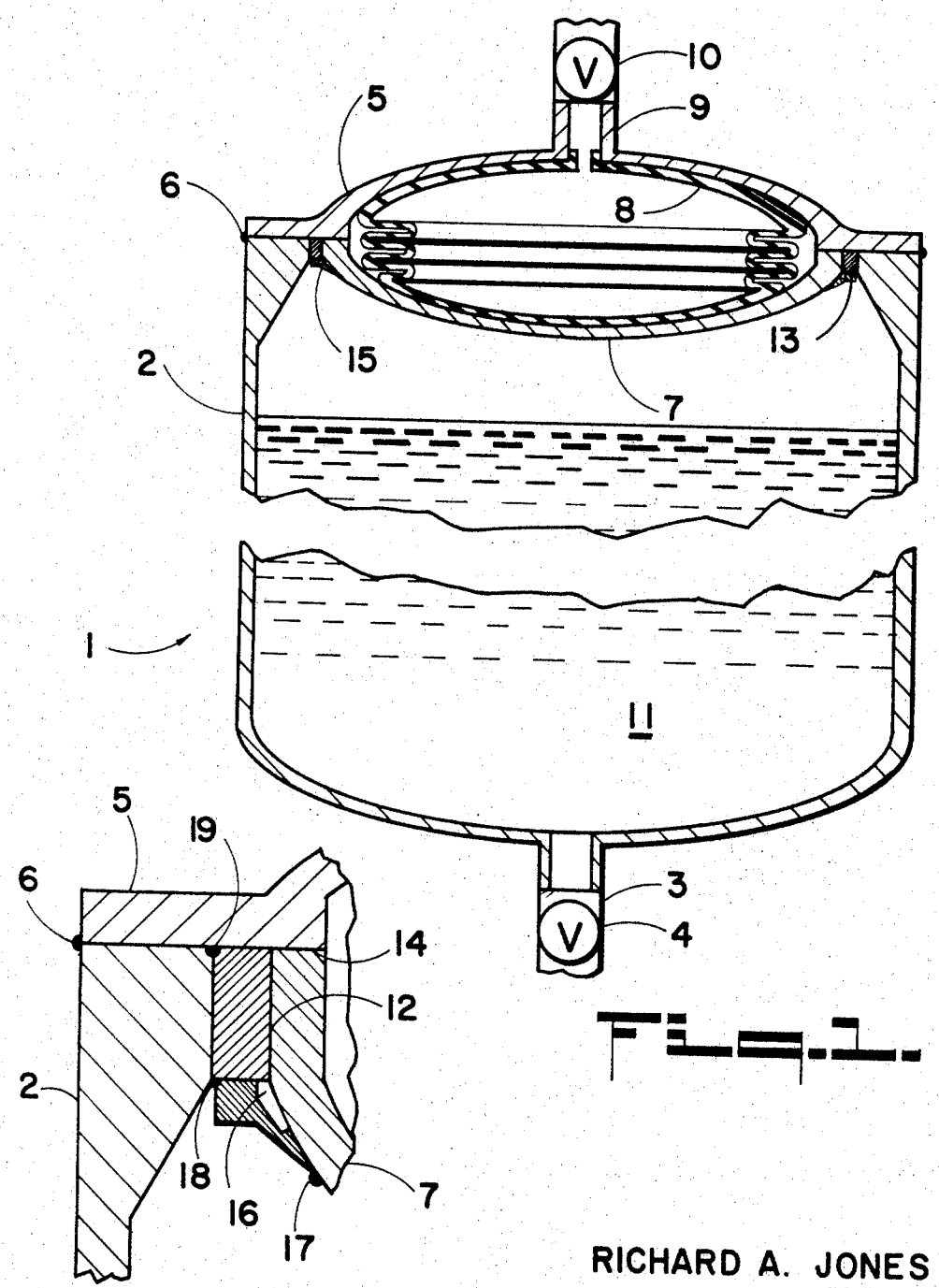
FIGURE 1 is a side sectional view through positive expulsion device.
FIGURE 2 is an enlarged view of a portion of FIGURE 1.

Referring to FIGURE 1, a positive expulsion device 1 comprises a tank 2 having an outlet 3 closed by a valve 4 or other suitable sealing means, a forward closure 5 secured to tank 2 by weld 6 or other suitable fastening means and a rigid piston 7. A volume is defined between closure 5 and piston 7 in which is mounted expansible bladder 8. Bladder 8 may be bonded to piston 7 or other means may be provided for preventing piston 7 from blocking outlet 3 upon actuation of the device. An inlet 9 for a pressurizing medium for expanding bladder 8 is provided which is closed by valve 10 or other suitable sealing means. A reactive fluid 11 is contained in tank 2.

Piston 7 may be in the form of a hollow cylindrical body closed at one end. As can be seen more clearly in FIGURE 2, the bladder receiving end of tank 2 has an internal diameter smaller than the rest of tank 2 to provide a cylindrical surface 12 which receives piston 7 in a sliding fit. The inner surface of closure 5 provides a shoulder portion 14 against which piston 7 abuts. Rigid piston 7 is of sufficient thickness to transmit the pressure loads which may be generated thereon to shoulder 14 without material deflection of piston 7. An annular cylindrical sleeve 13 is shown between piston 7 and tank 2 which facilitates fabrication of the device. However, if ready access can be had to the interior of tank 2 in the fabrication process surface 12 can be formed as a part of tank 2.

An annular frangible seal member 15 weakened as by annular notch 16 to break along a predetermined circle is welded or otherwise sealed to piston 7 and sleeve 13 by annular welds 17 and 18. The diameter of the break line is slightly smaller than the exterior diameter of piston 7 whereby the rough edge of that portion of seal 15 which remains on sleeve 13 on breaking of the seal may be smoothed by the passage of piston 7 thereacross.

To fabricate the device, piston 7, sleeve 13 and seal 15 would be assembled as a unit by weld 17 and 18. The entire assembly is inserted into tank 2 and sealed by annular weld 19. Closure member 5 with the bladder 8 would then be secured in place by annular weld 6 or other suitable fastening means. Tank 2 is filled with fluid 11 through valve 4 which would then be closed or a separate filling opening could be provided which could be closed and sealed after loading of tank 2. A vacuum is also drawn and maintained in bladder 8 and the volume between piston 7 and closure 5. In this manner, bladder 8 is hermetically sealed from the fluid 11 and seal 15 is maintained free from any pressure loads which could cause repeated deflection and fatigue failure of the seal.

In a typical application of this device fluid 11 would be a 75%–25% mixture of $N_2O_4$ and NO respectively and the device would be required to withstand daily thermal cycling from —65° F. to +165° F. for a period of five years. Under these conditions internal pressure will vary from 0 to 260 p.s.i.a. A hemispherically domed stainless steel piston 7, 1/8" thick and 10" in OD is adequate to transmit all pressure loads without measurable deflection of either piston 7 or seal 15. When bladder 12 is pressurized to expel the contents of tank 2, the cylindrical surface 12 provides for uniform longitudinal motion of piston 7 and even rupture of hermetic seal 15. As the cylindrical portion of piston 7 is forced past the broken seal the broken surface is smoothed and rolled back by piston means 7 thereby reducing the likelihood of rupturing the bladder.

I claim:
1. A positive expulsion device comprising:
   (a) an enclosed container having a fluid receiving portion and a bladder receiving portion;
   (b) a cylindrical internal surface on the bladder receiving portion of said enclosed container;
   (c) a rigid piston separating said fluid receiving portion of said enclosed container from said bladder re- ceiving portion, at least a portion of said piston being received in said cylindrical surface in sliding relationship therewith;

(d) load bearing means on said enclosed container abutting the bladder receiving side of said piston; and (e) frangible hermetic sealing means sealing said piston to said enclosed container on the fluid receiving side of said piston.

2. The device of claim 1 further comprising expansible bladder means in said bladder receiving portion, means for maintaining a vacuum in said bladder and means for supplying a pressurizing medium to said bladder.

3. The device of claim 2 wherein said frangible seal is adapted to break along a predetermined circle having a diameter slightly smaller than the external diameter of said piston.

4. The device of claim 3 further comprising a reactive fluid in said fluid receiving portion and outlet means for said fluid operable to permit expulsion of said fluid upon pressurization of said expansible bladder.

References Cited

UNITED STATES PATENTS

| 1,854,458 | 4/1932 | De Quincy et al. | 222—286.5 X |
| 2,941,699 | 6/1960 | Schmidt et al. | 222—327 |
| 2,980,177 | 4/1961 | Glasson | 222—83.5 X |

WALTER SOBIN, *Primary Examiner.*

U.S. Cl. X.R.

222—80, 541